Feb. 10, 1925.
A. J. KLONECK
1,526,308
SIMULTANEOUS SIGNALING AND RECEIVING SYSTEM
Filed Nov. 28, 1916
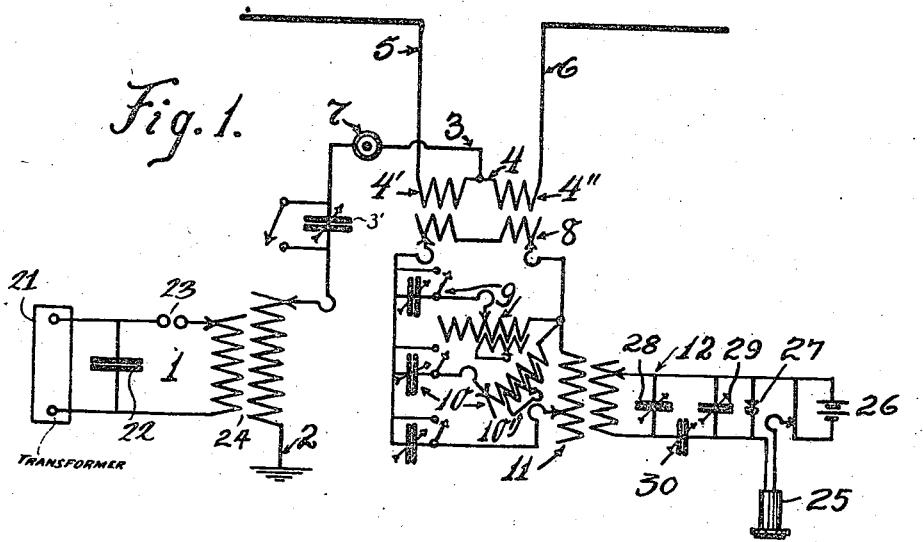
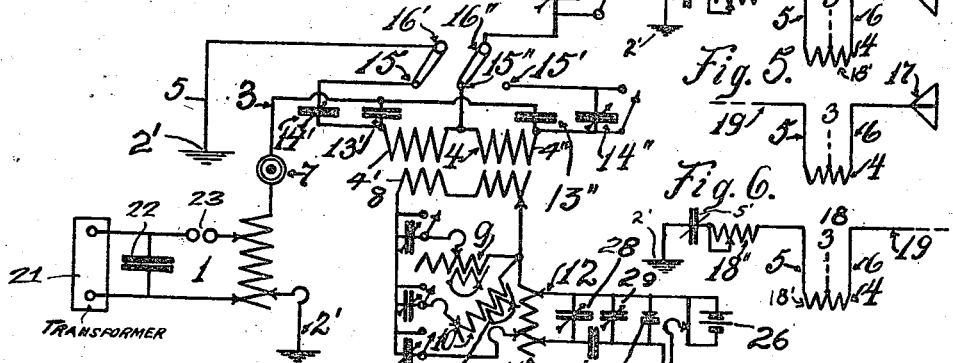

Patented Feb. 10, 1925.

1,526,308

UNITED STATES PATENT OFFICE.

AUGUST J. KLONECK, OF NEW YORK, N. Y.

SIMULTANEOUS SIGNALING AND RECEIVING SYSTEM.

Application filed November 28, 1916. Serial No. 133,886.

*To all whom it may concern:*

Be it known that I, AUGUST J. KLONECK, a citizen of the United States, and a resident of New York, in the county of New York and State of New York, have invented certain new and useful Improvements in Simultaneous Signaling and Receiving Systems, of which the following is a specification.

This invention relates to systems for simultaneously transmitting and receiving electrical energy, particularly in radio telephony and telegraphy although the system may also be employed for wire or cable signaling.

The object of this invention is to provide a system of electrical circuits whereby a high power current may be transmitted and simultaneously a feeble signal current received without disturbing the apparatus for receiving.

Another object of the invention is to provide an additional selective tuning system for receiving to prevent disturbances of received signals by the same or other not wanted transmitting stations.

These and other allied objects are attained by the novel arrangement of electrical circuits and elements hereinafter described and illustrated in the accompanying drawings in which:

Figure 1 shows the arrangement of electrical circuits and a receiving transformer, the middle or neutral point of a coil thereof being connected to a transmitting apparatus, while the ends of said coil are in connection with aerials or conductors which are shown extending in opposed horizontal directions. Figure 2 shows another independent system embodying a modified arrangement of electrical circuits and a receiving transformer, the latter having the middle point thereof in connection with one conductor which is shown as an aerial conductor and the ends of said transformer are connected to the transmitting apparatus. Figure 3 shows a station indicating at one terminal of a sending circuit the conductors as in Figure 1 connected to two aerials which are indicated as extending in opposite directions and form a receiving circuit through a receiving transformer. Figure 4 shows a modified form of a station with a ground circuit to one aerial and one balancing circuit of equal capacity and inductance. Figure 5 shows a station indicating at one terminal of a sending circuit another combination of connections for the conductors; one is an aerial and the other a line conductor. Figure 6 shows the transmitting apparatus having at one terminal a line circuit and an opposing balancing circuit.

In Figure 1, the numeral 1 represents a high frequency current generator of any suitable combination of elements, the one shown comprising a primary or secondary source of electrical current or a transformer 21, a condenser 22, and a spark gap 23 in circuit with a high frequency transformer 24, of which one terminal 2 is grounded at 2. The other terminal 3 is connected to a coil 4 of a receiving transformer at a point, whereby said coil 4 is divided into two equal coils 4′ and 4″. The ends of said coil 4 are connected to two conductors 5 and 6, which may be aerials for radio signaling and extend for instance as shown in opposite directions or the conductors may be cable wires or a combination with a separately grounded balancing circuit. The latter will be more fully described in connection with Figures 3 to 6. The sending apparatus may include a transmitter 7 and condenser 3′.

It will be noted that a transmitting current from terminal 3 of the transmitting apparatus will flow in two opposed directions through coils 4′ and 4″ to two separate transmitting conductors 5 and 6 preventing an energizing of a resultant magnetic field upon a receiving transformer 8. A receiving current from another station, however, will flow in the direction from one conductor to the other, thus energizing said coils 4′ and 4″ and by said coils the receiving transformer 8. The receiving circuit consists preferably of said secondary coil 8 of said transformer, suitably connected to convenient receiving apparatus. I prefer however, to employ a selective tuning circuit for receiving, which consists of three tuning circuits and elements; for instance coil 11 is connected to the receiving apparatus and tuned thereto, one of said coils, for instance coil 9, is tuned to a lower than the receiving frequency and another coil 10 is tuned to a higher frequency than that for the receiving apparatus. Selective circuits of similar appearance have been employed whereby currents of higher frequency are alleged to neutralize currents of lower frequency on the receiving apparatus. But inasmuch as currents of different frequencies can not be neutralized by each other, I prefer to separate the circuits from each other. For this purpose, the terminals of coil 8 of the transformer are connected to three tuning circuits 9, 10 and 11. Circuit 11 is shown operating the receiving apparatus 12. The latter may consist of any suitable combination of apparatus, as for instance, a telephone receiver 25, a battery 26, a wave detector 27 and the condensers 28, 29 and 30. Currents of circuits 9 and 10 are to be absorbed by a secondary resistance coil 10' of coil 10 for instance.

In Figure 2, the terminal 3 of the transmitting apparatus is in connection with the end portions 4' and 4'' of coil 4 of the receiving transformer by condensers 13' and 13''. The ends of said coil 4 are further connected through condensers 14' and 14'' to switch points 15 and 15'. The coil 4 consists of two half parts 4' and 4'', having a connection at the middle thereof to a switch point 15'', and through a switch lever 16'' to an aerial or conductor 6.

In Figure 2 it will be noted that a transmitting current from terminal 3 will enter both ends of coil 4 in equal strength, and partly surge oppositely to each other through the coil parts 4' and 4'' to contact 15'' and by switch 16'' to conductor 6. The latter is shown including additional capacity 6' and inductance 6'' for tuning the same to the desired frequency. Another part of the transmitting current at terminal 3 does not enter the coils but flows to a condenser 14' separately to earth 2', forming a ground circuit for transmitting and receiving. The last circuit 5 does not require absorbing means for current as a balance with circuit 6 although it may be tuned to the same frequency. Circuit 5 however is to be tuned to a frequency different from circuit 2 for the purpose to unbalance the receiving circuit 6 through circuit 5 or 2 to grounds 2' or 2''. It will be noted that a transmitting current will not energize coil 4, thus, no resultant magnetic field from said coil 4 will occur at the receiving coil 8. Further, receiving current will be tuned to flow from conductor 6 through said coil, by switch lever 16' and wire 5 to ground at 2' and thus energizing said coils 4 and 8 for the receiving apparatus, which may consist of the same elements and circuits as described in connection with Figure 1.

It will be noted that the conductor 6 of Figure 2 extends in opposed directions similarly to the two separate aerials of Figure 1, thus forming two branches of equal but opposed reactances in an equivalent aerial system such as shown in Figure 1. By tuning the receiving circuit of Figure 2 to another frequency from that as transmitted for instance, then the desired receiving energy will flow from aerial conductor 6 to the separate ground by conductor 5 while interference currents from another transmitter would flow to the counterpoising ground terminal 2 in opposed directions through the coil parts 13' and 13'' and thus not affect the receiver.

In Figure 3 is shown a radio station of which the numerals 17' and 17'' indicate two aerials extending in opposite horizontal directions for radio signaling to which the terminal 3 of transmitting coil 24 and the terminals of receiving coil 4 are connected for transmitting and receiving signals. For receiving purposes, said aerials as shown are extended in different directions corresponding with one type of directive aerials, commonly used for determining the direction of a sending radio station by means of a receiving coil such as coil 4 connected thereto. A transmitting current however, acts from one terminal 3 in two equal but opposite directions through coil 4 and upon said oppositely extending aerial similar to a loop or coil aerial having two corresponding but opposing parts connected with only one current phase or pole terminal or as for instance in Figure 2, wherein the aerial 6 extends in two opposed directions.

In Figure 4 is shown another radio station, wherein the numeral 3 designates one terminal of a transmitting circuit such as described in Figure 1 for instance, which employs one aerial 17 only connected to terminal 6 of the receiving coil 4 while the numeral 18 denotes a balancing circuit connected with terminal 5 of coil 4. Said balancing circuit 18 is shown comprising an inductive coil 18', in connection with an aerial and another circuit through a coil 18'' and a condenser 5' to ground. By connecting one end of coil 4 to the balancing circuit 18, a transmitting current will surge in equal strength but oppositely through the coil parts 4' and 4'' of coil 4, preventing an energizing of receiving coil 8 of the transformer.

In Figure 5 the conductors employed are for combined wire and radio signaling station wherein one terminal of a transmitting circuit such as previously described is designated by a numeral 3, while the numeral 17 denotes an aerial and 19 a line wire or a cable, both forming the terminals for the coil 4 of the receiving transformer for a combined radio and line signaling apparatus. The aerial 17 and the cable 19 are balanced for neutralizing a transmitting current from terminal 3 upon the receiving transformer 4 which causes the transmitting current to flow in opposed directions through the coil 4 while received signal current either from cable 19 or aerial 17 will flow in one direction through coil 4 either to the other conductor or to terminal 3 and by the latter to ground.

In Figure 6, the apparatus serves for communication by a line conductor 19 while an absorbing circuit 18, such as described in connection with Figure 4 serves for producing equal but opposing magnetic fields which results in a neutralization of the local transmitting current upon the receiving coils and apparatus.

It will be clear that the use of a separate ground as shown in these figures renders the second circuit independent as to tuning and operation at any desired frequency.

It will be noted that although the system shown in Figure 2 is the reverse with respect to Figure 1; both figures are based on magnetically neutralized coils 4' and 4" by a transmitting current which, however, are energizable with receiving currents.

Having fully described my invention what I claim as new and desire to secure by Letters Patent is:

1. A means for simultaneously transmitting and receiving electrical signals, comprising a ground-aerial circuit for transmitting and an aerial to aerial circuit for receiving, said aerials being common for both of said circuits.

2. A means for simultaneously transmitting and receiving electrical signals, comprising a ground-aerial transmitting circuit having opposing coils terminating in oppositely extending aerials, and a receiving aerial to aerial circuit, including said coils not opposing one another in the aerial to aerial circuit, and suitable elements for operating the device and for tuning desired currents included in said circuits.

3. In a means for simultaneously transmitting and receiving electrical signals, transmitting and receiving apparatus and circuits including condensers and coils, two laterally oppositely extending transmitting and receiving conductors having metallically open ends, two coils connected to said two conductors magnetically opposite with respect to a common terminal for both coils for transmitting apparatus, and means in connection with said coils for controlling receiving apparatus, said coils being magnetically similarly connected with respect to and from one of said two conductors to the other of said two conductors.

4. In a means for simultaneously transmitting and receiving by two independent conductors, transmitting and receiving circuits and apparatus, a plurality of common energy conductors and transformer coils, said transmitting circuit having one terminal connected to ground, having the other terminal connected to two inductively opposing coils of said transformer and to two earth insulated of said conductors, said receiving circuit and apparatus being in operative relation with said transformer coils said two transformer coils having a like number of turns and a similar characteristic with respect to one another, said two transformer coils being energizable by received energy surging to and from one of said earth insulated conductors to the other earth insulated conductor or the ground.

5. As a means for simultaneously transmitting and receiving signals, transmitting and receiving apparatus and circuits, means for tuning and utilizing the same, a plurality of energy radiating elements and a transformer, said transmitting circuit terminating at one end to a radiating element and at the other end to two coils of said transformer oppositely connected together with respect to the transmitting circuit, said two coils of said transformer forming a receiving circuit with another of said radiating elements, said coils not opposing one another for receiving signals and being similar to one another, the terminal of said transmitting circuit at the two coils end including their mentioned radiating element being earth insulated and actively transmitting through each of said opposing coils of said receiving transformer.

6. A means for transmitting and receiving electrical signals simultaneously, comprising transmitting and receiving circuits and elements including a plurality of transmitting conductors for the terminals of the transmitting circuit, a pair of said conductors being insulated from a connection with the earth and serving for a terminal for the transmitting circuit and for the two opposing terminals for the receiving circuit including two co-operating coils arranged therebetween, said coils being connected at one end to the other terminal of the transmitting circuit and at their other ends to said pair of conductors, said coils being similarly connected with respect from one of said pair of conductors to the other of said pair of conductors for a receiving circuit and oppositely with respect to said other terminal of said transmitting circuit, said circuits including suitable elements for utilizing and for absorbing electrical currents.

7. As a means for simultaneously transmitting and receiving signals electrically, transmitting and receiving apparatus and circuits including common radio electric conductors, a receiving transformer having two similar coils connected together, two earth separated of said conductors for actively transmitting radio current in connection with said coils of the receiving transformer, the latter operating the receiving circuits and apparatus by received signal current surging cooperatively through said two coils to and from said conductors, the transmitting circuit comprising a separate conductor at one terminal and said two conductors connected with said coils of said receiving transformer at the other terminal, the transmitting radio current surging through a condenser in opposed directions through said coils adapted to prevent energization of said receiving transformer and apparatus.

8. A means for transmitting and receiving electrical signals simultaneously, comprising transmitting and receiving circuits and apparatus and a plurality of radiating conductors, a pair of said conductors extending horizontally and in opposed directions forming one terminal for the transmitting circuit by means of two coils connected to said terminal and said pair of conductors, said coils being oppositely connected with respect to said transmitting terminal, said pair of conductors forming the two terminals for a receiving circuit including said two coils connected in nonopposing relation.

9. As a means for transmitting and receiving signals simultaneously by common energy radiating conductors, the combination of a transmitting circuit and a receiving circuit and apparatus including inter-connected circuits and radiating conductors, one of said circuits including two coils of like characteristics connected together and to certain of said radiating conductors, the other of said circuits having one terminal connected to said coils and the other terminal connected to another conductor separate from said certain conductors of said first described circuit of said two coils, all of said conductors being active and in non-artificial circuits, the conductors of the first described circuit extending horizontally with respect to the surface of the earth.

10. In a means for transmitting and receiving signals simultaneously, transmitting and receiving circuits including transformers and common radio conductors, two earth separated of said conductors extending in different directions being connected together through similar coils of one of said transformers forming a circuit therebetween, another of said transformers being connected between all of said conductors including said two conductors, the similar coils of said first mentioned transformer and the mentioned circuit at one terminal of said second mentioned transformer, said similar coils being magnetically oppositely connected to said terminal of the second mentioned transformer, all of said conductors being active and operating in nonartificial circuits, certain of said circuits including condensers.

11. A means for simultaneously transmitting and receiving electrical signals including transmitting and receiving circuits and apparatus, a directive aerial circuit and a counterpoising ground terminal, said directive aerial circuit having an intermediate terminal at a point of equal reactances therefrom, means for connecting one of said circuits between said intermediate terminal of said branched portions of the directive aerial circuit and said counterpoising ground terminal, and means for employing said branched portions of the directive aerial for the terminals of the other of said circuits.

12. A means for simultaneously transmitting and receiving electrical signals comprising transmitting and receiving circuits and apparatus, including a ground-aerial circuit comprising two branched portions of equal but opposed reactance, said branched portions comprising a directive aerial circuit wherein said reactances mutually assist each other, and means for operating each of said circuits at any desired frequency independently from each other.

13. A means for simultaneously transmitting and receiving signals comprising transmitting and receiving circuits and apparatus, including a directive aerial having an operating characteristic in one direction serving for the terminals of one of said circuits, and said aerial and another conductor having an operating characteristic in all directions serving for the terminals of the other of said circuits, the aerial terminal of the last mentioned circuit forming two branched portions of equal but opposed reactance of the directive aerial circuit for operating each of said circuits independently of one to another at any desirable frequency.

14. In a means for transmitting and receiving electrical signals of any desired frequency irrespective of one to another, local transmitting and receiving circuits and apparatus, radio conductors common for said transmitting and receiving circuits, the receiving circuit including two similar coils, means for connecting one of the oppositely wound coil ends of each of said coils to one terminal of said transmitting circuit, means for connecting the other terminal of said transmitting circuit to a suitable radio conductor, means for connecting the remaining two ends of said similar coils to said common radio conductors in a manner so as to permit an independent reception of signals between said mentioned common conductors, substantially as set forth, said coils and said common conductors forming two branches of equal reactance and opposed magnetic fields with respect to the transmitting circuit, causing an opposed energization of said coils and thus preventing a resultant energization of the receiver by energy from the operating transmitter, all of said conductors operating exclusive of an artificial balance circuit.

15. A means for transmitting and receiving electrical signals of any frequency independently of one to the other including two local signaling circuits and two balanced radio circuits, one of said signaling circuits terminating in a directive aerial to aerial circuit, the other of said circuits being attached at a point exactly intermediate of said directive aerial to aerial circuit, the latter branching from said intermediate point to two portions of equal reactance but opposed electrical fields for preventing an energization of one of said circuits by energy emanating from the other of said radio circuits.

In witness whereof I hereunto subscribe my name in the presence of two witnesses.

AUGUST J. KLONECK.

Witnesses:
S. CHESSIDING,
MARK BIRNBAUM.